US010692030B2

(12) United States Patent
Haligowski et al.

(10) Patent No.: US 10,692,030 B2
(45) Date of Patent: Jun. 23, 2020

(54) PROCESS VISUALIZATION PLATFORM

(71) Applicant: Amazon Technologies, Inc., Seattle, WA (US)

(72) Inventors: Mateusz Haligowski, Seattle, WA (US); Pablo Alberto De Stefani Casanova, Seattle, WA (US); Ramakanthachary S. Gottumukkala, Sammamish, WA (US); Nalledath Vinodkrishnan, Sammamish, WA (US); Aravindhan Rathakrishnan, Bellevue, WA (US); Phillip Scott Segel, Auburn, WA (US); Nader Ali Syed Shirazie, New York, NY (US); Saravana Prasad Stalin, Redmond, WA (US); Branden Nicholas Vandermoon, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 695 days.

(21) Appl. No.: 15/188,596

(22) Filed: Jun. 21, 2016

(65) Prior Publication Data
US 2017/0364843 A1    Dec. 21, 2017

(51) Int. Cl.
*G06Q 10/06* (2012.01)
(52) U.S. Cl.
CPC .............. *G06Q 10/0633* (2013.01)
(58) Field of Classification Search
CPC .............. G06Q 10/00; G06Q 30/02
(Continued)

(56) References Cited

U.S. PATENT DOCUMENTS 6,226,787 B1 * 5/2001 Serra .................. G06F 11/3664
714/E11.217
6,938,240 B2 * 8/2005 Charisius .............. G06Q 10/06
717/104
(Continued)

FOREIGN PATENT DOCUMENTS

JP        2010123124 A    6/2010
JP        2016062293 A    4/2016
WO    WO2012070254 A1    5/2014

OTHER PUBLICATIONS

Meyer et al., Visual Monitoring of Process Runs: An Application Study for Stored Procedures, Apr. 19-22, 2016, IEEE Pacific Visualization Symposium 2016, pp. 160-166.*
(Continued)

*Primary Examiner* — Robert D Rines
(74) *Attorney, Agent, or Firm* — Lee & Hayes, P.C.

(57) ABSTRACT

This disclosure describes methods, apparatuses, and systems for providing visualizations of workflows. Data associated with successes and failures of individual components of workflows can be collected and aggregated to provide an overview of the operation of workflows, as well as allowing a software developer to troubleshoot operations of the workflow. Status indications of steps can be visualized in a graphical user interface (GUI), for example, and faults can be identified and presented in the GUI. By aggregating workflow data across hundreds, thousands, or even millions of workflows, a user can quickly determine the overall operations of the workflow, as well as areas of the workflow that may need improvement.

20 Claims, 9 Drawing Sheets

(58) Field of Classification Search
USPC .............................................. 705/7.11–7.42
See application file for complete search history.

(56) References Cited

U.S. PATENT DOCUMENTS

| | | | | |
|---|---|---|---|---|
| 7,184,967 | B1* | 2/2007 | Mital | G06Q 10/06316 705/7.26 |
| 7,350,188 | B2* | 3/2008 | Schulz | G06Q 10/06 717/104 |
| 7,644,001 | B2* | 1/2010 | Schuijers | G10L 19/008 704/500 |
| 7,661,061 | B2* | 2/2010 | Joshi | G06F 8/20 715/205 |
| 8,041,588 | B2* | 10/2011 | Gilbert | G06F 3/04817 705/7.11 |
| 8,417,682 | B2* | 4/2013 | Wilcox | G06Q 10/06 707/705 |
| 9,286,584 | B2* | 3/2016 | Mayerle | G06Q 10/06 |
| 2007/0192118 | A1* | 8/2007 | Bukovec | G06Q 10/06 345/441 |
| 2007/0260499 | A1* | 11/2007 | Greef | G05B 19/409 705/7.26 |
| 2008/0120574 | A1* | 5/2008 | Heredia | G06Q 10/06 715/835 |
| 2011/0307856 | A1* | 12/2011 | Klaka | G06Q 10/06 717/104 |
| 2012/0035968 | A1 | 2/2012 | Gilbert et al. | |
| 2012/0120078 | A1* | 5/2012 | Hubbard | G06F 11/34 345/440.2 |
| 2015/0029193 | A1* | 1/2015 | Krajec | G06T 11/206 345/440 |

OTHER PUBLICATIONS

The PCT Search Report and Written Opinion dated Aug. 17, 2017 for PCT application No. PCT/US2017/037527, 14 pages.

Inoue, "Developing Performance Evaluation Environment for Large Scale Supercomputers", Information Processing Society of Japan Transactions, Apr. 15, 2011, vol. 4, No. 1, pp. 1-23.

The Japanese Office Action dated Nov. 5, 2019, for Japanese Patent Application No. 2018-564944, a counterpart foreign application of the U.S. Appl. No. 15/188,596, 10 pages.

* cited by examiner

PROCESS VISUALIZATION PLATFORM

BACKGROUND

Companies and organizations operate computer networks that interconnect numerous computing systems to support their operations. The computing systems can be located in a single geographical location (e.g., as part of a local network) or located in multiple distinct geographical locations (e.g., connected via one or more private or public intermediate networks). Data centers can house significant numbers of interconnected computing systems, such as, for example, private data centers operated by a single organization and public data centers operated by third parties to provide computing resources to customers. These computing systems can run numerous instances of customer programs, processes, and/or workflows. As the scale and scope of programs, processes, and/or workflows has increased, the task of provisioning, administering, and monitoring processing within the computing systems has become increasingly complicated.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
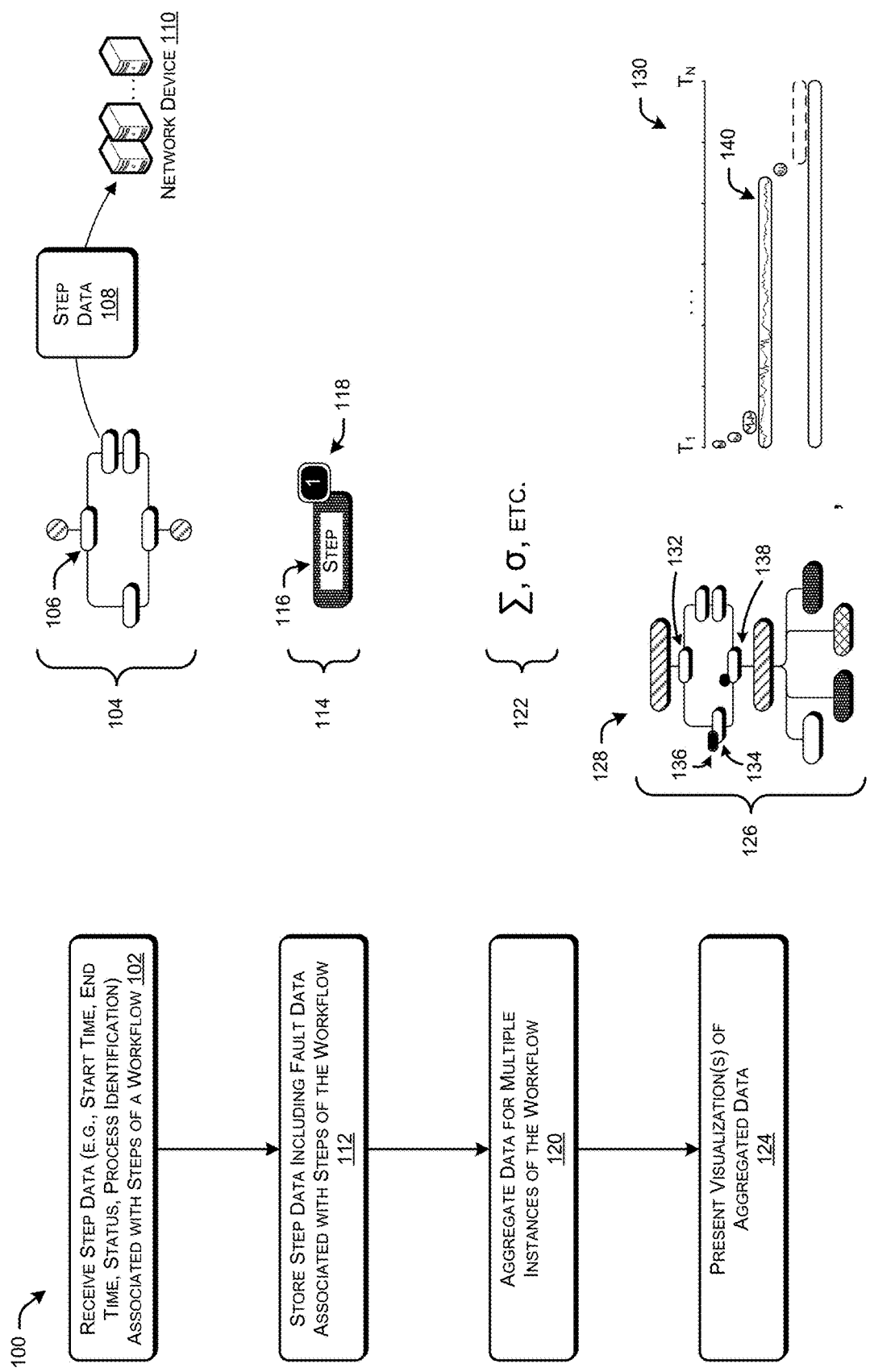
FIG. 1 illustrates a pictorial flow diagram of a process for implementing process visualization in a workflow engine.

This disclosure describes methods, apparatuses, and systems for providing visualizations of workflows. Data associated with successes and failures of individual components of workflows can be collected and aggregated to provide an overview of the operation of workflows, as well as allowing a software developer to troubleshoot operations of the workflow. Status indications of steps can be visualized in a graphical user interface (GUI), for example, and faults can be identified and presented in the GUI. By aggregating workflow data across hundreds, thousands, or even millions of workflows, a user can quickly determine the overall operations of the workflow, as well as areas of the workflow that may need improvement.

In general, workflows can include steps representing any operations performed with inputs and outputs. For example, processing workflows can include computer program modules that are coupled together to provide an integrated processing pipeline. Individual components of a workflow can generate data and/or metadata during operations, which can include a start time, an end time, a status, and identifying information. As workflow information is collected at a workflow visualization engine, the data can be aggregated to provide an overview of the status of any workflow to aid in troubleshooting and/or general understanding of the processes.

A workflow can include any sequence of operations configured in any manner to perform a task. One example of workflows can include converting electronic files from one format to another. Another example of a workflow can include a process for processing a payment for an online transaction. Another example can include a process for receiving restaurant orders and preparing a meal. In these examples, workflows (also referred to as processes) can be broken into steps (also referred to as activities), where each step can perform one or more tasks within the overall workflow.

In some embodiments, the visualization engine can provide detail views of workflows as a graph and/or as a timeline. Tags can be associated with workflows and/or steps within the workflow, which allows users to search for individual workflows and/or steps to evaluate performance across multiple instances. The visualization engine allows a user to select individual steps within a workflow to view information associated with the steps, such as start time, end time, elapsed time, number of attempts, identification information, etc. Visualizations of timelines of workflows allows users to view relative and/or absolute latencies of steps and workflows, as well as system overhead associated with the time between various steps. As failures are identified, the visualization engine allows users to navigate within the GUI to investigate individual or aggregated workflow statistics. In some instances, the GUI may provide access to workflow logs and/or to edit programming code to remedy any fault or failure.

In some instances, the workflow visualization tools discussed herein improve a functioning of a computer by allowing a user to quickly identify faults and/or failures in workflows, processes, steps, and/or activities, for subsequent remediation. In some instances, by providing visualizations representing workflow latencies, the disclosure allows processing latency to be reduced, which improves a functioning of any underlying workflows, such as those running on computing systems. Optimized workflows reduce processing time and improve memory usage. In some instances, faults can be determined and workflows including steps susceptible to faults can be paused and stored in a queue to resume processing after the remediation of the fault. Thus, wasted processing can be avoided, thereby improving a functioning of a computer.

The methods, apparatuses, and systems described herein can be implemented in a number of ways. Example implementations are provided below with reference to the following figures.

FIG. 1 illustrates a pictorial flow diagram 100 of a process for implementing process visualization in a workflow engine. FIG. 1 illustrates a high-level pictorial flow diagram, and additional details of the implementation are given throughout this disclosure.

At 102, the operation can include receiving step data associated with each step of a workflow, such as a start time, an end time, a status, and/or a step identification. As discussed herein, a step may include any series of operations including inputs and outputs that make up a workflow.

An exemplary workflow is illustrated as a workflow 104, including a step 106. In some instances, the step 106 may comprise a discrete step, and in some instances, the step 106 may represent another workflow, such as a child workflow or a nested workflow. That is, in some instances, the step 106 may be associated with various workflows and/or or substeps, and may be represented as a single step 106 to provide varying levels of abstraction.

As the workflow 104 is initiated, for example, in response to a user invocation or call, individual step of the workflow 104 may perform the processing associated with each step. As the step 106 operates, the step 106 may provide step data 108 to a network device 110, for example. In some instances, the network device 110 can include a computing system capable of processing the workflow 104. In some instances, the network device 110 can receive the step data 108 from one or more computing devices remote from the network device 110.

The step data 108 can include, for each step, a start time, an end time, a step status, and/or a step identification. For example, a start time can indicate a time at which the step 106 started (e.g., received inputs, was invoked by a user or another step, etc.), while an end time can indicate a time at which the step 106 has ended (e.g., provided an output, completed processing, etc.). The step status can indicate a current status of the workflow 104 and/or the step 106, such as whether the workflow 104 and/or the step 106 was successful, unsuccessful, timed-out, terminated, interrupted, skipped, etc. The step identification can include an identity of the step 106, and/or an identity of the workflow 104 associated with the step 106. In some instances, the step identification can include one or more tags associated with the step 106 and/or the workflow 104 to facilitate filtering and/or searching at a later time. In some instances, tags may be added by a user, for example.

In some instances, the workflow 104 and/or the step 106 can provide step data 108 to the network device 110 in response to a request for information from the network device 110. In some instances, the workflow 104 and/or the step 106 can write step data 108 to a data file, which the network device 110 can access and determine the operations of the workflow 104 and/or the step 106. In some instances, the workflow 104 and/or the step 106 can push the step data 108 to the network device 110, and in some instances, the network device 110 can pull the step data 108 from the workflow 104 and/or the step 106. In some instances, the step data 108 can be provided at regularly-scheduled intervals, and in some instances the step data 108 can be provided upon request or demand.

At 112, the operation can include storing step data, including fault data associated with steps of the workflow. In some instances, the operation 112 can include determining data that is relevant to faults (e.g., exception errors, error logs, etc.) and storing the data associated with the fault in the network device 110, for example. In some instances, step data 108 can be stored for all steps, and is not limited to steps associated with a fault or failure. As illustrated in example 114, a step 116 can be associated with exception data 118, as discussed herein. In some instances, the step 116 can be annotated or decorated with information including, but not limited to a number exceptions, a number of successful steps, a number of pending steps, etc.

At 120, the operation can include aggregating data associated with a plurality of instances of workflow operation. For example, at scale, the workflow 104 may be invoked hundreds, thousands, or millions of times. Step data (e.g., the step data 108) from each invocation of the workflow 104 can be received and stored for data aggregation. In an example 122, data aggregation may include determining a sum and/or standard deviation of the various step data, and can include analysis including determining an average latency of various steps or standard deviations of the step operation latencies. Further, aggregation operations may include determining a total number of invoked steps and/or workflows, a number of completed steps and/or workflows, a number of failed steps and/or workflows, a number of active steps and/or workflows, a number of paused steps and/or workflows, a number of terminated steps and/or workflows, etc. Further, the operation 120 may include determining overhead of the workflow 104, which may include processing time associated with setting up steps, and/or storing or accessing data. In some instances, system overhead may depend on available resources associated with the workflow operation (e.g., a number of processors, network bandwidth, workflow priority, etc.).

At 124 the operation can include presenting one or more visualizations of the aggregated data. For example, exemplary visualization are illustrated as visualizations 126, including an aggregated graph view 128 and an aggregated latency timeline view 130. In some instances, the operation 124 may include searching and/or filtering the aggregated data to present visualization data related to one or more queries, such as searching for steps that have failed or are associated with particular tags, particular time periods, etc. In some instances, the graph view 128 can include an aggregated step 132, which can correspond to aggregated step instances corresponding to the step 106. The graph view 128 also illustrates an aggregated step 134 which has been annotated with an exception indication 136, which can indicate a number of exceptions identified in the aggregated data. Further, as can be understood in the context of this disclosure, the aggregated graph view 128 and the aggregated latency timeline view 130 can correspond to aggregated data associated with the same workflow 104. That is, an aggregated step 138 included in the aggregated graph view 128 can correspond to an aggregated step 140 in the aggregated latency timeline view 130. Additional details and examples of the graph view 128 are provided in connection with FIG. 7, and additional details and examples of the timeline view 130 are provided in connection with FIGS. 8 and 9.

In some instances, the operation 124 can include, but is not limited to, presenting one or more alarms, reports, alerts, etc. related to the step data and/or aggregated data. For example, in addition to or instead of presenting visualizations of aggregated data, the operation 124 may include alerting a user or administrator via email of one or more exceptions of a workflow.

The example process 100 in FIG. 1 is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media can include non-transitory computer-readable storage media, which can include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media can include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

In one particular implementation, and without limitation, the workflow 104 can correspond to a workflow to determine a price of an electronic book. Individual steps may include: 1) determining a publisher's suggested price; 2) determining pricing promotions associated with the book; 3) determining a location of a user; 4) determining an adjusted price of the book based on any promotions; and 5) converting the adjusted price into a currency associated with the user. It can be understood that each of the steps 1-5 introduced above can include multiple sub-steps and/or calls to various databases and memory locations, some of which may be constantly updated. Further, it can be appreciated that this exemplary workflow can be repeated hundreds, thousands, or millions of times each day.

As the exemplary workflow is invoked, the various invocations of the workflow can be referred to as instances of the workflow. Step data (e.g., the step data 108) can be collected for each step 1-5 of each instance of the workflow. That is, start times, stop times, status indications, identification information, tags, etc. can be received and associated with each step every time the exemplary workflow is performed.

Step data for various step instances can aggregated and presented in a visualization. For example, average execution times of each of the steps 1-5 can be determined, and a graph view or latency timeline view (e.g., similar to the examples 126) can be generated and presented to a user. In the event that some steps and/or workflows fail, exceptions can be noted and provided as a graphic in the visualization. For example, an instance of step 5 (e.g., converting the adjusted price into a currency associated with the user) may fail if a currency conversion rate is unavailable. In such a case, the visualization of the step 5 may indicate an exception, and selection of the exception in the GUI can provide additional details relating to the exception. In some instances, users can quickly search through invocations of workflows to determine patterns of exceptions and/or to determine a root cause of a failure. In the example above, a user can narrow a search by currency to determine that failures arise during a conversion from one particular currency to another particular currency. Thus, users can rapidly diagnose and troubleshoot workflow operations using the visualization tools discussed herein.

Figure 2:
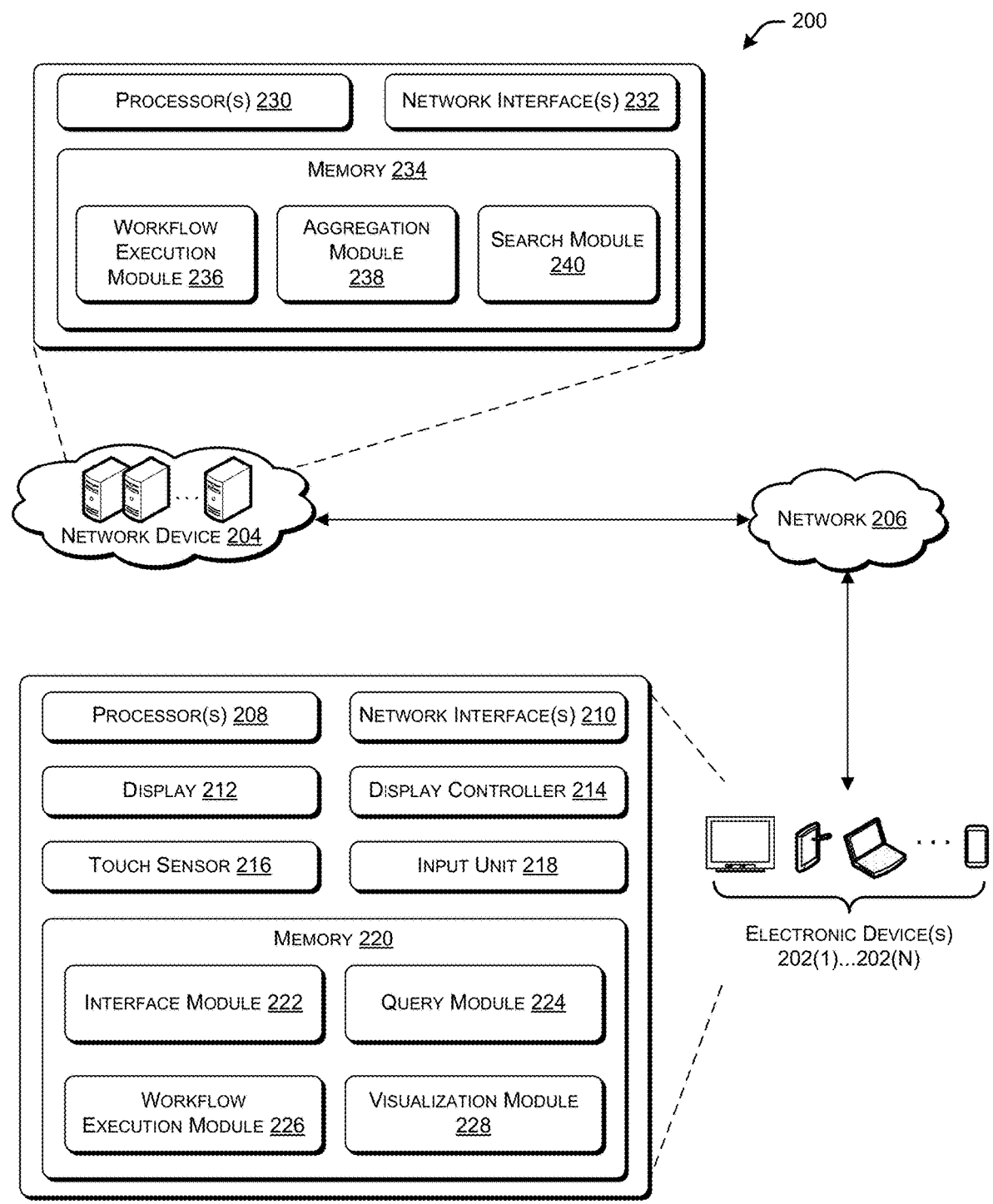
FIG. 2 illustrates an example environment for implementing the workflow visualization in the workflow engine.

FIG. 2 illustrates an example environment 200 for implementing the workflow visualizations in the workflow engine. In some instances, the example environment can include one or more electronic devices 202(1)-202(N) in communication with a network device 204 via a network 206. In some instances, the electronic device 202 may comprise any type of mobile electronic device (e.g., a laptop computer, a tablet computing device, an electronic reading device (e.g., an electronic book (eBook) reader device), a multifunction communication device, a portable digital assistant (PDA), a mobile phone, a smartphone, a gaming console, etc.) or non-mobile electronic device (e.g., a desktop computer, a server computer, a television, etc.). In addition, while FIG. 2 illustrates several example components of the electronic device 202, it is to be appreciated that the electronic device 202 may also include other conventional components, such as system busses, input/output components, and the like.

In various embodiments, the electronic device 202 includes one or more processors 208 and one or more network interfaces 210. The processor(s) 208 may include any one or more central processing units or graphic processing units. The network interface(s) 210 may support both wired and wireless connection to the network 206 and various other networks, such as cellular networks, radio, Wi-Fi networks, short range networks (e.g., Bluetooth, LoRa, Zigbee, etc.), infrared, and so forth.

The electronic device 202 also includes one or more displays 212 and corresponding display controllers 214. The one or more displays 212 may represent a variety of displays, including but not limited to light emitting diode (LED) displays, liquid crystal displays (LCDs), cathode-ray tube (CRT) displays, projection displays, electronic paper displays and/or other displays having similar display properties to those described herein. The display controller(s) 214 may include hardware and/or software components configured to interface with and control the display(s) 212.

In various embodiments, the electronic device 202 includes one or more touch sensors 216. In some instances, at least one touch sensor 216 resides underneath or on top of a corresponding display 212 to form a touch-sensitive display that is capable of both accepting user input and rendering content corresponding to the user input. In other instances, the electronic device 202 may include a touch sensor 216 that is adjacent to the display 212. It is to be appreciated that in some instances, the touch sensor 216 and the display 212 can form a touch-sensitive display, and in some instances the touch sensor 216 and the touch-sensitive display 212 do not form such a display.

In some instances, the electronic device 202 may further include an input unit 218 in addition to the touch sensor 216. The touch sensor 216 is to be understood as one possible type of input unit 218. Other input units 218 may include keyboards, key pads, computer mice, joysticks, video cameras (e.g., for gesture-based inputs), microphones (e.g., for audio input and/or voice-based commands), etc. The input units 218 may include any input mechanism.

The electronic device 202 may include memory 220. Depending on the configuration of the electronic device 202, the memory 220 (and other memories described throughout) is an example of computer-readable storage media and may include volatile and nonvolatile memory. Thus, the memory 220 may include, but is not limited to, RAM, ROM, EEPROM, flash memory, or other memory technology, or any other medium which can be used to store media items or applications and data which can be accessed by the electronic device 202.

In various embodiments, the memory 220 may be used to store an interface module 222, a query module 224, a workflow execution module 226, and a visualization module 228. In some instances, the interface module 222 may provide any graphical user interfaces (GUI) to the user in accordance with this disclosure. In some instances, the query module 224 may operate in conjunction with the interface module 222 and may receive inputs and/or indications from a user to search, filter, or otherwise manipulate aggregated data to review workflow execution. For example, as discussed herein, the query module 224 can search for or filter aggregated workflow data by tags, execution status, time period, etc. In some instances, the workflow execution module 226 may initiate execution of one or more workflows to be processed locally on the electronic device 202, processed remotely on the network device 204 (or some other remote device), and/or some combination of the two (e.g., local and remote processing). In some instances, the visualization module 228 can render visualizations on the display 212, for example, in response to information provided by the network device 204. For example, the visualization module 228 can generate visualizations such as those provided in connection with FIGS. 3-9. In some instances, the visualization module 228 can provide graphs and/or timelines corresponding to workflow operation to the interface module 222 of the electronic device 202. In some instances, the visualization module 228 can provide data about an individual instance, and in some instances, the visualization module 228 can provide visualizations of aggregated data.

In some instances, the electronic device 202 can include an interface to debug and/or compile code based in part on the operation of the workflows, as discussed herein.

The network device 204 may include one or more processors 230, one or more network interfaces 232, and a memory 234. Further, the memory 234 can include a workflow execution module 236, an aggregation module 238, and/or a search module 240.

In some instances, the workflow execution module 236 can execute one or more workflows in accordance with the disclosure. For example, workflows can include programs, processes, and/or steps provided by a user to execute on the network device 204. In some instances, the workflow execution module 236 may execute workflows on computing resources allocated to the user. In some instances, the workflow execution module 236 may execute multiple instances of a particular workflow in serial or in parallel. In some instances, the workflow execution module 236 can interrupt, pause, terminate, or restart any workflows for any reason. By way of example, a user can pause or terminate execution of a step or workflow after determining that a particular step of the workflow is frequently encountering errors. After the user has resolved the issue (e.g., by editing the program code associated with the error) the user can restart individual steps or workflows.

In some instances, the aggregation module 238 can aggregate data associated with the execution of workflows, processes, steps, and/or activities. For example, the aggregation module 238 can store start times, end times, status information, and step information for each instance of each step. In some instances, the aggregation module 238 can operate on the step data 108 received from the workflow and/or steps, as discussed in connection with FIG. 1. Aggregation operations include determining a running time associated with each step and analyzing the running times of various instances of the steps to determine an average running time, minimum running times, maximum running times, standard deviation of running times, setup times, overhead, etc. In some instances, the aggregation module 238 can provide raw data to a user who may perform their own analysis of the step data (e.g., step data 108). In some instances, the aggregation module 238 can aggregate a number of instances of workflows and/or steps over time (e.g., total instances of steps, instances of steps for a particular time period, etc.).

In some instances, the search module 240 can search for and/or filter aggregated data based on one or more attributes. For example, the search module 240 can search workflow data based on workflow or step identification information, step status (e.g., completed, failed, paused, terminated), step times (e.g., start, end, etc.), customer identification, geographical region, tags, etc. With respect to the tags (e.g., automatically generated or user-generated metadata, usually descriptive), one or more tags can be associated with one or more steps and/or workflows. For example, a workflow associated with file conversion can be tagged with the input format, the output format, and/or a descriptor such as "conversion." In some instances, tags may include product codes, ISBNs (International Standard Book Numbers), keywords, user names, step names, function names, etc. Further, and without limitation, the search module 240 can filter according to one or more of the following: execution time, request ID, execution ID, run ID, tags, priority level, exceptions, inputs, outputs, exports, logs, version, number of attempts, IP names/versions, host, state, status, links, step data, elapsed time, failure time, namespace, etc.

In some instances, one or more components or modules of the environment 200 can be implemented in any device in the environment. For example, the aggregation module 238 can be implemented in the electronic device 202, while a query module 224 can be implemented in the network device 204. Further, components or modules discussed herein may be duplicated in various devices of the environment. Thus, the disclosure is not limited to the configuration illustrated in FIG. 2.

Figure 3:
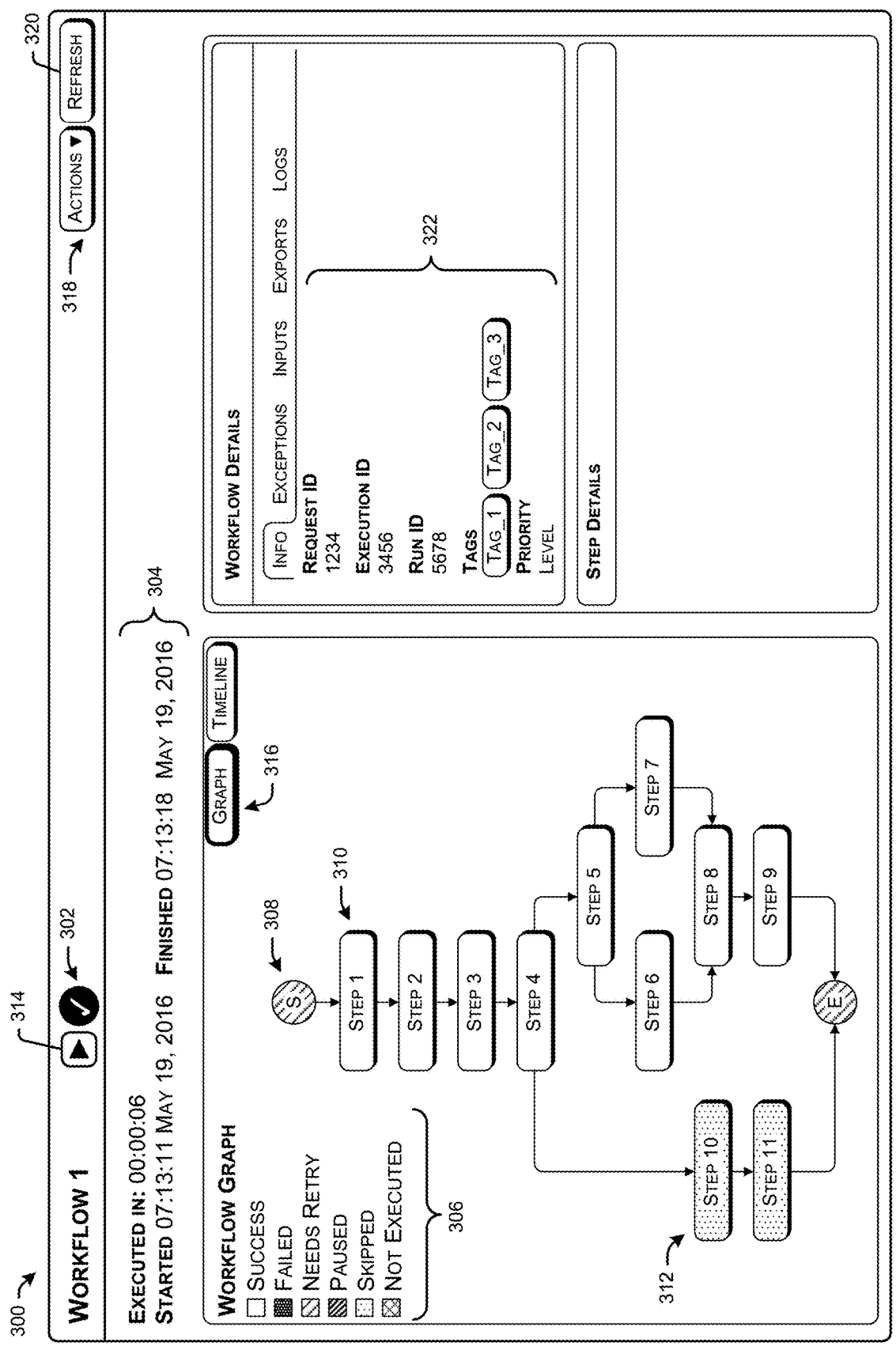
FIG. 3 shows a graphical user interface (GUI) illustrating a workflow detail view in a workflow visualization.

FIG. 3 shows a graphical user interface (GUI) 300 illustrating a workflow detail view in a workflow visualization. For example, the workflow visualization in FIG. 3 illustrates the operation of Workflow 1 comprising Steps 1-11. As can be understood in the context of this disclosure, the Workflow 1 can include any number of steps arranged in any order.

Aspects of the workflow visualization simply and clearly convey to a user a structure of the workflow and a result of the operation. For example, a graphic 302 indicates that the operation of Workflow 1 was successful. Portion 304 of the GUI 300 illustrates an execution time of the workflow, as well as when the workflow was started and ended. The status of the various Steps 1-11 may be color-coded or designated using different patterns, symbols, characters, etc., for quick recognition. For example, the legend 306 (i.e., the section designated as "Workflow Graph") illustrates the execution status of the workflow steps by designating the steps with various patterns, as illustrated in FIG. 3. For example, a start node 308 is illustrated with a pattern corresponding to the "needs retry" status; a step 310 is illustrated with a pattern corresponding to a "success" status; and a step 312 is illustrated with a pattern correspond to the "skipped" status. In some instances, the step 312 may have been skipped by a user, or by the execution of the Steps 5-9 as a parallel path. In some instances, a user may add, remove, customize, or otherwise customize statuses illustrated in the legend 306. In some instances, a code button 314 can be selected in the GUI 300 to view the programming code of one or more steps of the Workflow 1.

In some instances, steps can be labeled with a unique step name or any descriptor associated with the workflow and/or steps. In some instances, a size, a shape, a color, a pattern, text, etc., of a step within the visualization of the workflow can correspond to a latency of processing, a number of lines of code associated with the step, a number of exceptions associated with the step, an arbitrary size set by the workflow engine and/or by a user, based on a selection of a step, status of a step (e.g., completed, active, skipped, failed, etc.), number of sub-steps associated with the step, inputs/outputs of a step, etc. In some instances, steps can be a uniform size, shape, pattern, color, etc. In some instances, steps can be visualized with varying sizes, shapes, patterns, colors, etc. in accordance with the factors described herein.

The GUI 300 further includes a selection button 316 allowing a selection between a graph view and a timeline view. The timeline view is discussed in connection with FIG. 5. In some instances, a selection of the selection button 316 can be illustrated in the GUI 300 as a heavy outline, a change in color, a change in size, etc. The GUI 300 further includes an action selector 318 and a refresh button 320, which allows a user to select various actions to be performed in associated with the workflow visualization, and allows a user to refresh the workflow visualization, respectively. For example, actions associated with the action selector 318 can include, but is not limited to pause, terminate, re-run, etc.

Workflow details are provided in the GUI 300 via a details tab 322. For example, in the details tab 322, details of the workflow can be provided, including but not limited to, a request ID (indicating an entity that initiated the workflow request), an execution ID (indicating the execution information of the workflow), a run ID (providing a unique identification of a particular workflow operation), one or more tags (automatically generated and/or provided by a user), and a priority level (e.g., low, medium, high, etc.). In some instances, a user may browse additional details of the workflow, including exceptions (e.g., faults or failures), inputs, exports, and/or logs (e.g., error logs, operation logs, etc.). In some instances, a user may view and/or edit some or all of the computer code associated with the workflow via the GUI 300. Selection of any one of the components illustrated in the GUI 300 allows a user to receive more information about a particular step. Further, the workflow detail view provides an overview of the steps in the workflow, as well as an overview of the overall operation of the workflow in the GUI 300.

Figure 4:
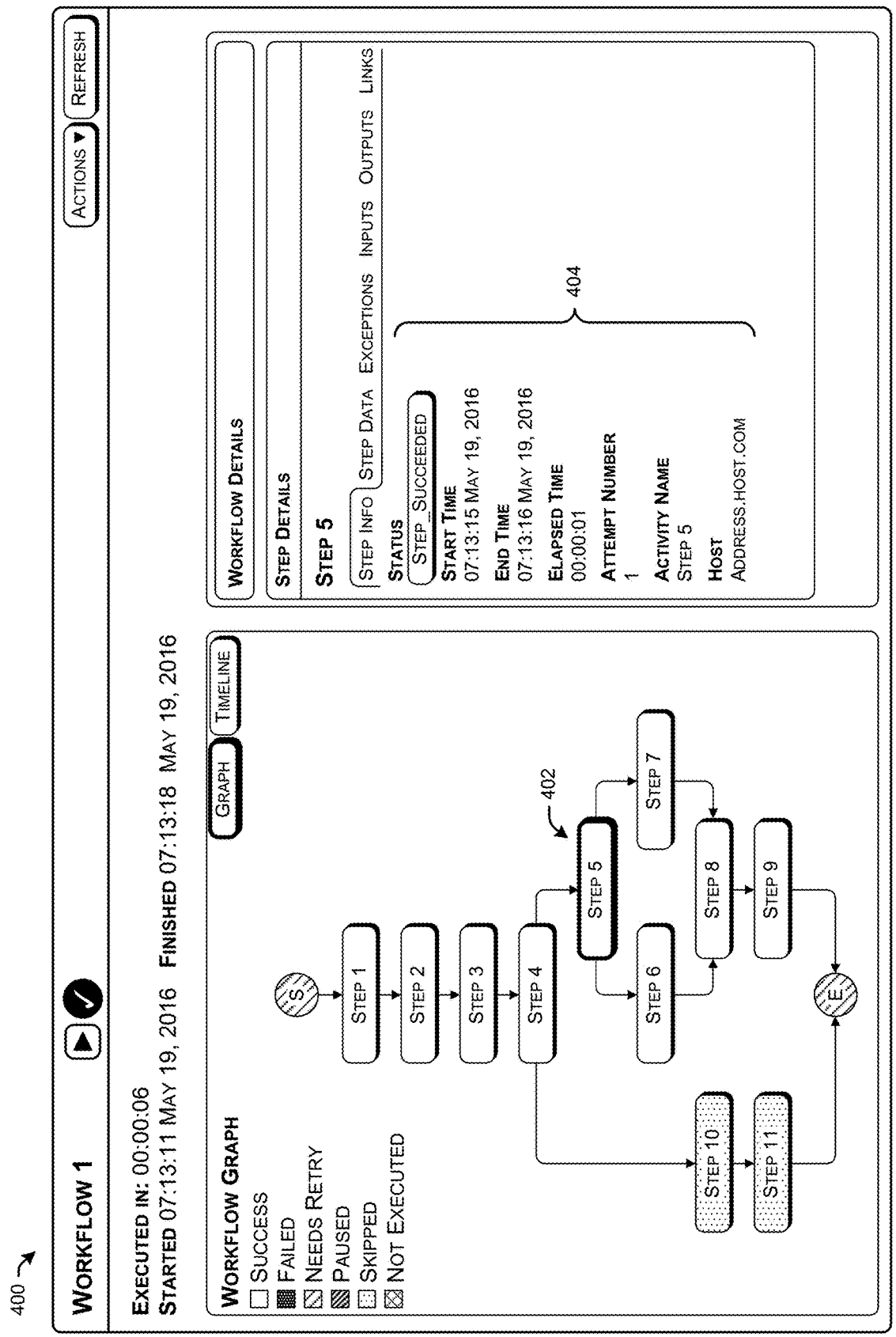
FIG. 4 shows a GUI illustrating a step detail view in a workflow visualization.

FIG. 4 shows a GUI 400 illustrating a step detail view in a workflow visualization. For example, the GUI 400 illustrates Workflow 1, which corresponds to the Workflow 1 illustrated in FIG. 3. By way of distinction, as FIG. 3 illustrates a workflow details view, FIG. 4 illustrates a step details view corresponding to step 402. For example, a user may select each individual step of the Workflow 1, causing details of the selected step to be presented in area 404. For example, the area 404 presents additional details of the step 402, such as the status of the step execution (e.g., "step_succeeded"), a start time of the step, an end time of the step, an elapsed time of the step, a number of attempts, an activity name associated with the step, and/or a host address associated with the step. In some instances, further aspects of the step details can be presented in the GUI 400 by selecting the various tabs "Step Data," "Exceptions," "Inputs," "Outputs," and "Links." In some instances, the step detail view of the GUI 400 provides specific information to a user to debug, troubleshoot, and/or understand specific steps of a workflow.

Figure 5:
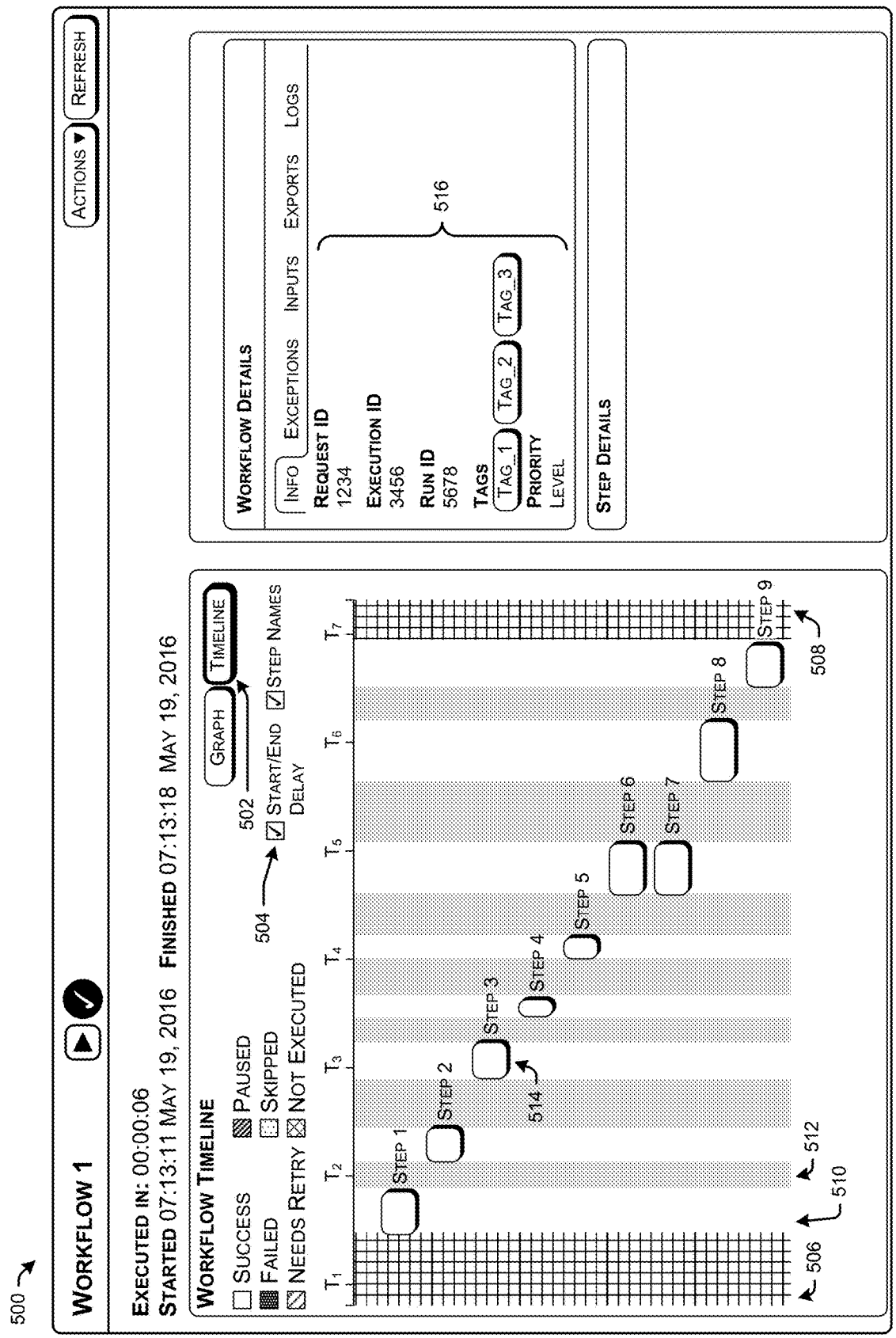
FIG. 5 shows a GUI illustrating a workflow timeline view in a workflow visualization.

FIG. 5 shows a GUI 500 illustrating a workflow timeline view in a workflow visualization. In some instances, the GUI 500 illustrates a Workflow 1, which may correspond to the Workflow 1 of FIGS. 3 and 4. In this GUI 500, however, the visualization is illustrated as a timeline view, in addition to the graph views illustrated in FIGS. 3 and 4. For example, the GUI 500 includes a timeline selection button 502, which when selected, can switch the visualization from a graph view to the timeline view. As illustrated, the timeline view includes options 504 allowing a user to select whether to illustrate start/end delays and/or step names. As illustrated, the GUI 500 illustrates step names of Steps 1-9. In some instances, the GUI 500 omits steps that are skipped during execution (e.g., Steps 10 and 11).

The timeline view in the GUI 500 can provide a visual indication of the workflow, as well as relative amounts of execution time and latency associated with each step of the Workflow 1, from times $T_1$ through $T_7$. For example, Step 1 is illustrated with a longer bar than Step 2, corresponding to a longer elapsed time of Step 1 as compared to Step 2. Further, the timeline view illustrates a sequence of operations. Step 1 is physically illustrated as occurring before Step 2 in the timeline view, which can illustrate an order of operations in the Workflow 1. For example, Steps 6 and 7 are illustrated as occurring in parallel, which can correspond to parallel execution of the Workflow 1.

Further, the timeline view in the GUI 500 can illustrate various latencies associated with execution of the Workflow 1. For example, area 506 at the beginning of the timeline view can correspond to a time between when an execution of the Workflow 1 was executed and an initiation of the execution of Step 1 (e.g., a start delay). Further, an area 508 at the end of the timeline view can indicate an amount of time following the completion of Step 9 and until the completion of the Workflow 1 (e.g., an end delay). A white space 510 can correspond to an execution time of each step (e.g., Step 1), while a grey area 512 can indicate some overhead processing of the workflow engine while no steps are being executed. In some instances, the latency illustrated as the grey area 512 can correspond to data being transferred in memory, instructions being loaded into memory, function calls from one step to another, etc. In some instances, individual bars for the steps (e.g., bar 514) can be colorized or otherwise illustrated (with patterns, text, etc.) according to a final status of the step, for example.

In some instances, in the timeline view illustrated in the GUI 500, workflow details can be provided in area 516. In some instances, as the Workflow 1 of FIG. 5 corresponds to the Workflow 1 of FIG. 3, the workflow details provided in the area 516 can correspond to the workflow details provided in the area 322 of FIG. 3. Further, as can be understood in the context of this disclosure, a user can select individual steps of the Workflow 1, which can cause step details to be displayed in the GUI 500, similar to the step details illustrated in FIG. 4.

Figure 6:
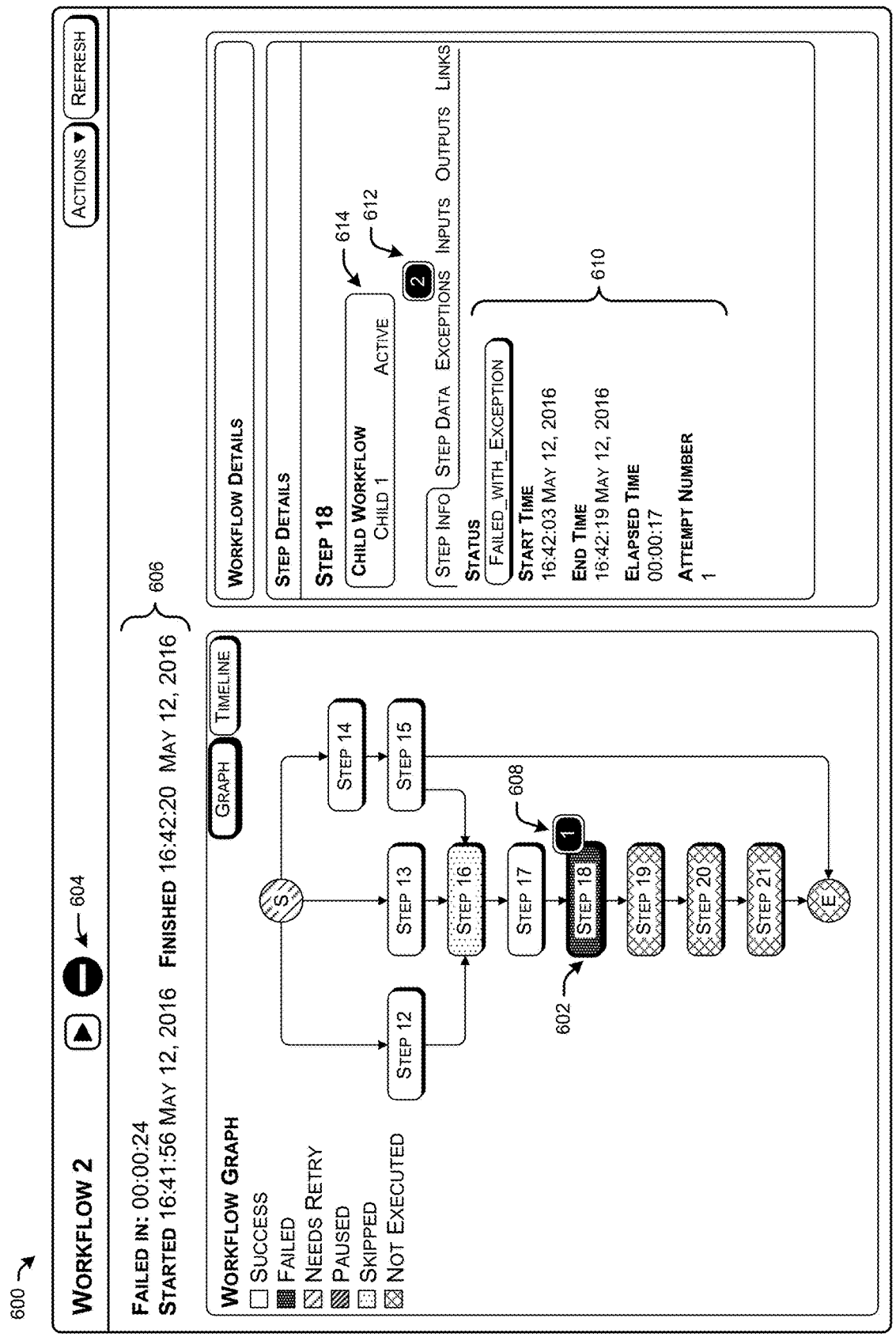
FIG. 6 shows a GUI illustrating a workflow detail view of a failed step in a workflow visualization.

FIG. 6 shows a GUI 600 illustrating a workflow detail view of a failed step in a workflow visualization. In some instances, the Workflow 2 in the GUI 600 has failed, at Step 18, illustrated as step 602. For example, the failed step can be colored (or differentiated using text, patterns, etc.) in the GUI 600 to indicate that the step has failed, in accordance with the Workflow Graph legend. By way of example, Step 16 is illustrated as "skipped" in the Workflow 2, and Steps 19, 20, and 21 are illustrated as "Not Executed," as the processing of the Workflow 2 was terminated when the Step 18 failed. Further, in some instances, a failed indication can be provided as a graphic 604. Details of the amount of execution time before the workflow failed, the start time, and the finish time are illustrated in an area 606.

In addition to the step 602 illustrated as "failed," the step 602 can be appended with an exception 608, which can illustrate a number of exceptions associated with the execution of the step 602. As can be understood, steps may fail and/or encounter exceptions for any number of reasons. For example, individual steps may fail is a link for a database call is broken, and needed information cannot be accessed; data can be received by a step in a format not accepted by the step (e.g., as a character string instead of an integer); steps can time out if a network is congested and a response is not received within a specified time; etc. In some instances, steps can be annotated or illustrated with information relating to any aspects discussed herein, and such annotations or illustrations are not limited to exceptions.

In some instances, as the step 602 can be selected in the GUI 600, the step details can be provided in an area 610 providing information corresponding to the failed execution of the step 602. For example, the step details in the area 610 can include, but are not limited to, a status of the step (e.g., "Failed_with_Exception"), a start time, an end time, an elapsed time (e.g., until failure of the step), a number of attempts, and a state of the step. In some instances, further information associated with the step execution can be provided in the step details, such as "Step Data," "Exceptions," "Inputs," "Outputs," and "Links." Additional information associated with exceptions can be illustrated as an annotation 612 above the Exceptions tab, which can provide additional information when activated (e.g., selected) by a user. In some instances, the step details view can provide links to error logs associated with the exception of the step instance. Thus, users can quickly access an error log associated with an exception to troubleshoot and/or remedy a root cause of an exception.

In some instances, the step 602 can have associated child workflows, while in some instances, the step 602 can represent an entire workflow. For example, additional information associated with any child workflows can be provided in the step details as child workflow information 614. As can be understood, the child workflow information 614 can be activated by a user to provide additional details (e.g., as a workflow graph or timeline view, workflow details, step details, etc.) within the GUI 600.

As can be understood, a user can alternate between a graph view and a timeline view of the failed workflow, in accordance with embodiments of the disclosure. Further, workflow details can be provided regarding the failed workflow, in addition to or instead of the step details illustrated in the GUI 600.

Figure 7:
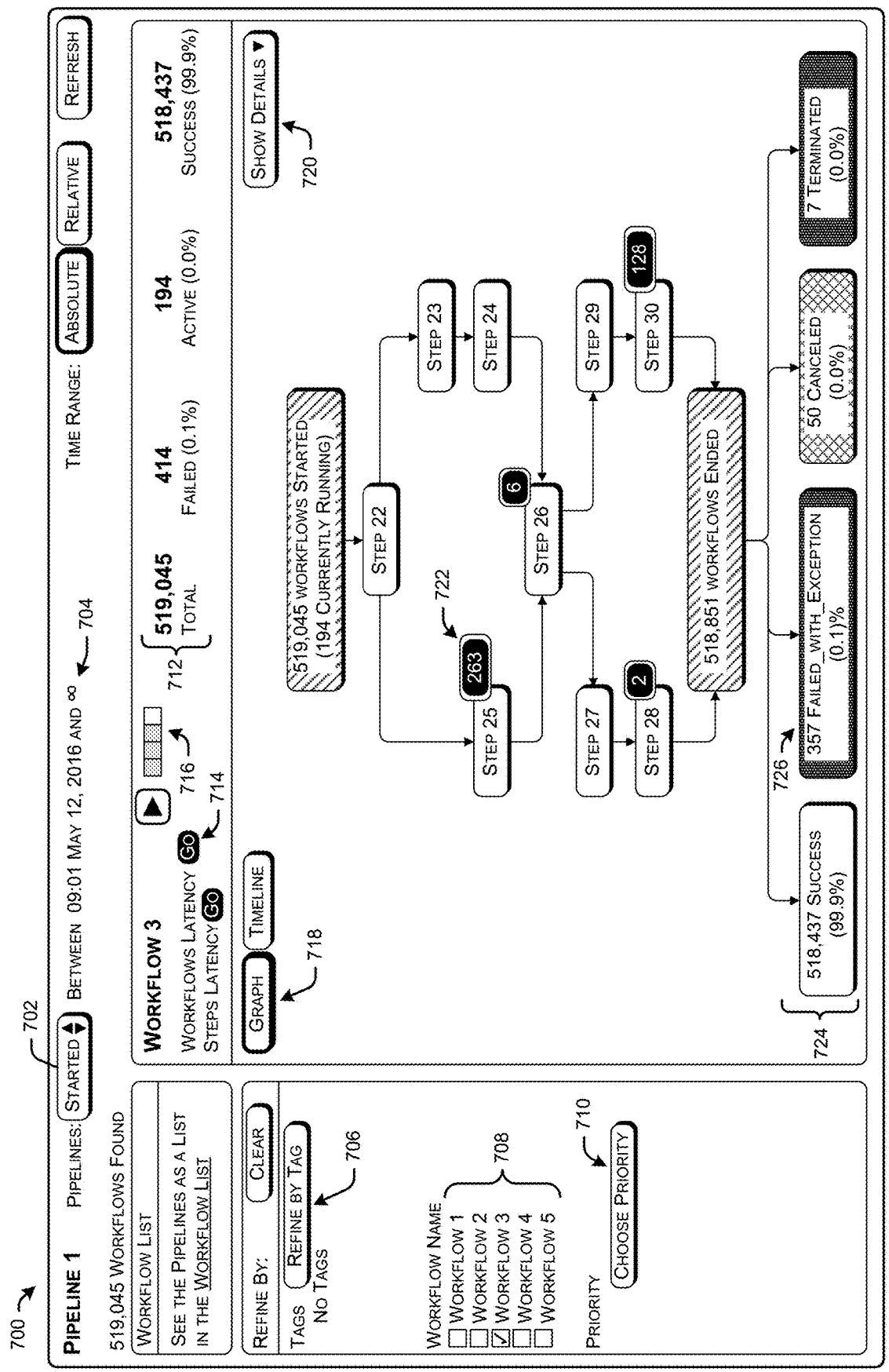
FIG. 7 shows a GUI illustrating an aggregated workflow view including aggregated failure instances.

FIG. 7 shows a GUI 700 illustrating an aggregated workflow view including aggregated failure instances. In some instances, the GUI 700 illustrates aggregated data of Workflow 3 over 519,045 instances of the Workflow 3. That is, the Workflow 3 has been executed 519,045 times in total, and FIG. 7 represents the aggregated data associated with the individual steps. In some instances, the aggregated data corresponding to a workflow can be referred to as a pipeline. FIG. 7 illustrates a Pipeline 1 of Workflow 3.

The aggregated data illustrated in FIG. 7 can be searched and/or filtered according to a status of the workflows (e.g., illustrated as status 702) over a time period designated in area 704. For example, further statuses can be selected as the status 702, including but not limited to, started, completed, terminated, paused, active, skipped, etc. Further, any time period can be identified in the area 704.

Additional searching and/or filtering can be provided within the GUI 700, for example. A list of workflows can be provided in the GUI, as well as regions of the GUI 700 to refine a search by Tags, Options, Workflow Name, Priority, etc., without limitation. In some instances, a user can search for tags using a tag button 706, can select a workflow listed in the region 708, and/or can filter by priority using a priority selection button 710.

As searching and/or filtering is applied to the various workflows, an overview of the aggregated data can be presented in the GUI 700 in a summary 712. For example, the summary 712 can list a total number of workflows aggregated in the pipeline, a number of failed workflows, a number of active workflows, a number of successful workflows, etc. In some instances, colors, patterns, sizes, shapes, or other indications of the summary information can correspond to the colors, patterns, sizes, shapes, or other indications of the various steps illustrated in the Workflow 3 to facilitate identification of the status of various steps.

The GUI 700 further illustrates links to more detailed information regarding workflow latency and steps latency. For example, a graphic 714 can be activated to present latency information associated with the workflow. Further, the GUI 700 can illustrate a bar graph 716 illustrating an amount of the workflow represented in the pipeline view.

A graph selection button 718 allows users to switch between a graph view and a timeline view. A "Show Details" selection button 720 allows users to select individual steps and/or to view additional details of the workflow or of individual aggregated steps in the workflow.

An exception annotation 722 can illustrate a number of exceptions associated with the particular step (e.g., Step 25) within the filtered aggregated data. In some instances, a user can activate the exception annotation 722 to display or otherwise present additional data relating to the exceptions associated with the step. In some instances, workflows can be grouped by result and presented in the GUI 700 as a summary 724, whereby different statuses can be selected and activated to provide additional information about the grouped workflows. For example, a user can activate a button 726 to present additional information regarding the 357 failed workflows associated with the Pipeline 1. As discussed above, annotations or illustrations are not limited to exceptions, and any information relating to steps and/or workflows can be annotated or illustrated, in accordance with embodiments of the disclosure.

Figure 8:
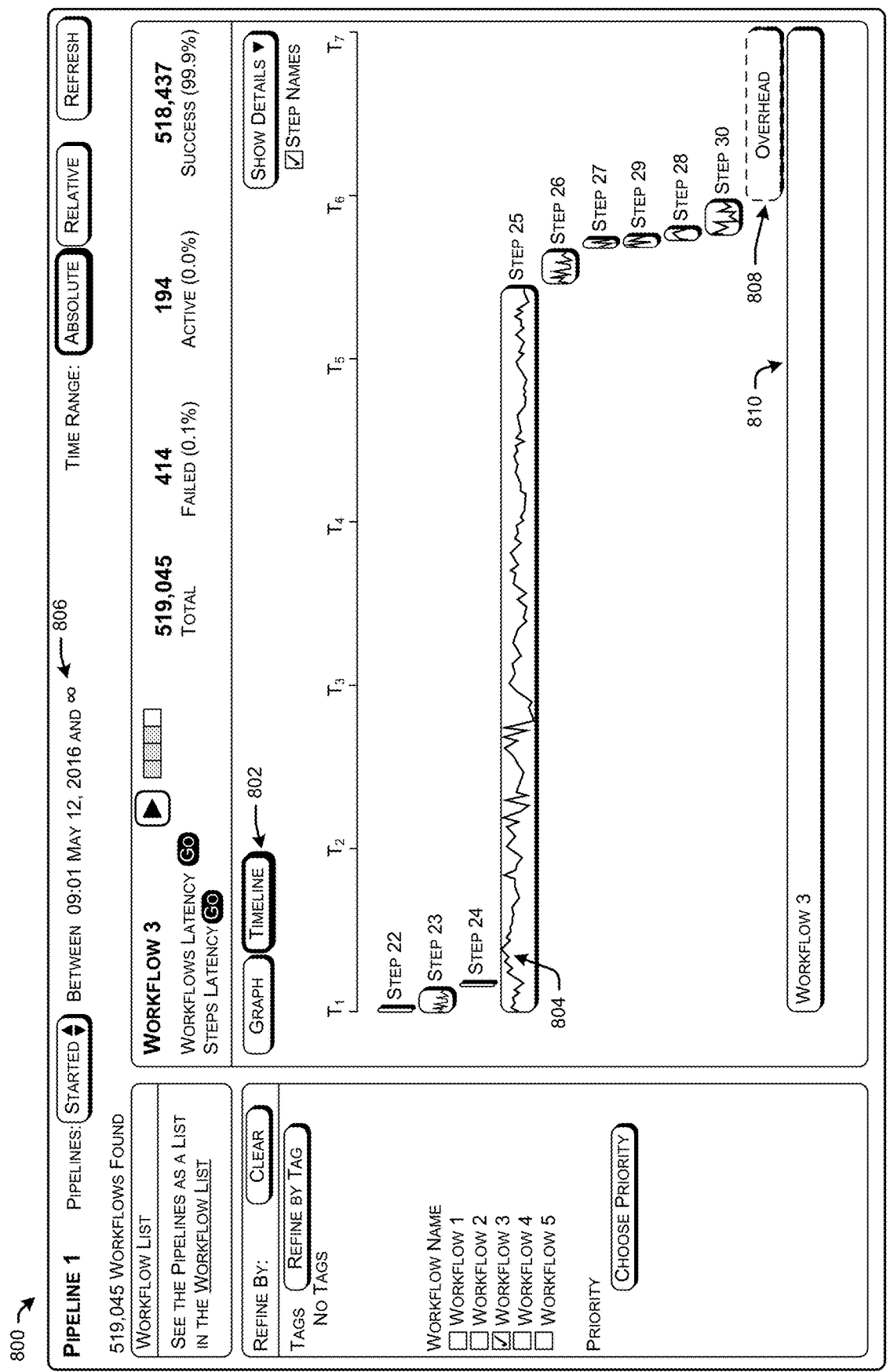
FIG. 8 shows a GUI illustrating an aggregated workflow latency timeline including latency graphs for individual steps.

FIG. 8 shows a GUI 800 illustrating an aggregated workflow latency timeline including latency graphs for individual steps. In some instances, the GUI 800 can illustrate Pipeline 1, which can correspond to the Pipeline 1 illustrated in FIG. 7. For example, a user can activate the timeline view selection button 802 to alternate between the graph view (e.g., as illustrated in FIG. 7) and the timeline view (e.g., as illustrated in FIG. 8).

The timeline view in the GUI 800 can provide a visual indication of the steps in the workflow, as well as relative amounts of execution time and latency associated with each step of the Workflow 3, from times $T_1$ through $T_7$. For example, Step 24 is illustrated with a shorter bar than Step 25, corresponding to a shorter aggregated elapsed time of Step 24 compared to Step 25. In some instances, the length of the bars associated with steps can correspond to an average execution time for each step over the period associated with the aggregated data; in some instances, the length can correspond to a shortest execution time or a longest execution time. In some instances, the length of bars in the GUI 800 can correspond to an average execution time, with standard deviation illustrated as bars integrated with the GUI 800.

In one example, individual step bars can include a latency graph 804 that can illustrate how the latency for the particular step varied throughout the aggregated time period 806 (e.g., a time period from May 12, 2016 until the present). For example, if the filtered time period 806 represents a week of time, the latency graph 804 can illustrate a latency of the particular step (e.g., Step 25) over the week long time period indicated in the aggregated timeline. With respect to the latency graph 804, a horizontal axis of the latency graph 804 can refer to a time axis, while a vertical axis of the latency graph 804 can refer to a latency associated with the step at a particular time.

In some instances, an overhead of the workflow can be represented as an overhead 808. The overhead 808 can represent an average overhead associated with the aggregated data of the Pipeline 1. In some instances, the GUI 800 can include a bar 810 illustrating a total average latency of the Workflow 3.

Figure 9:
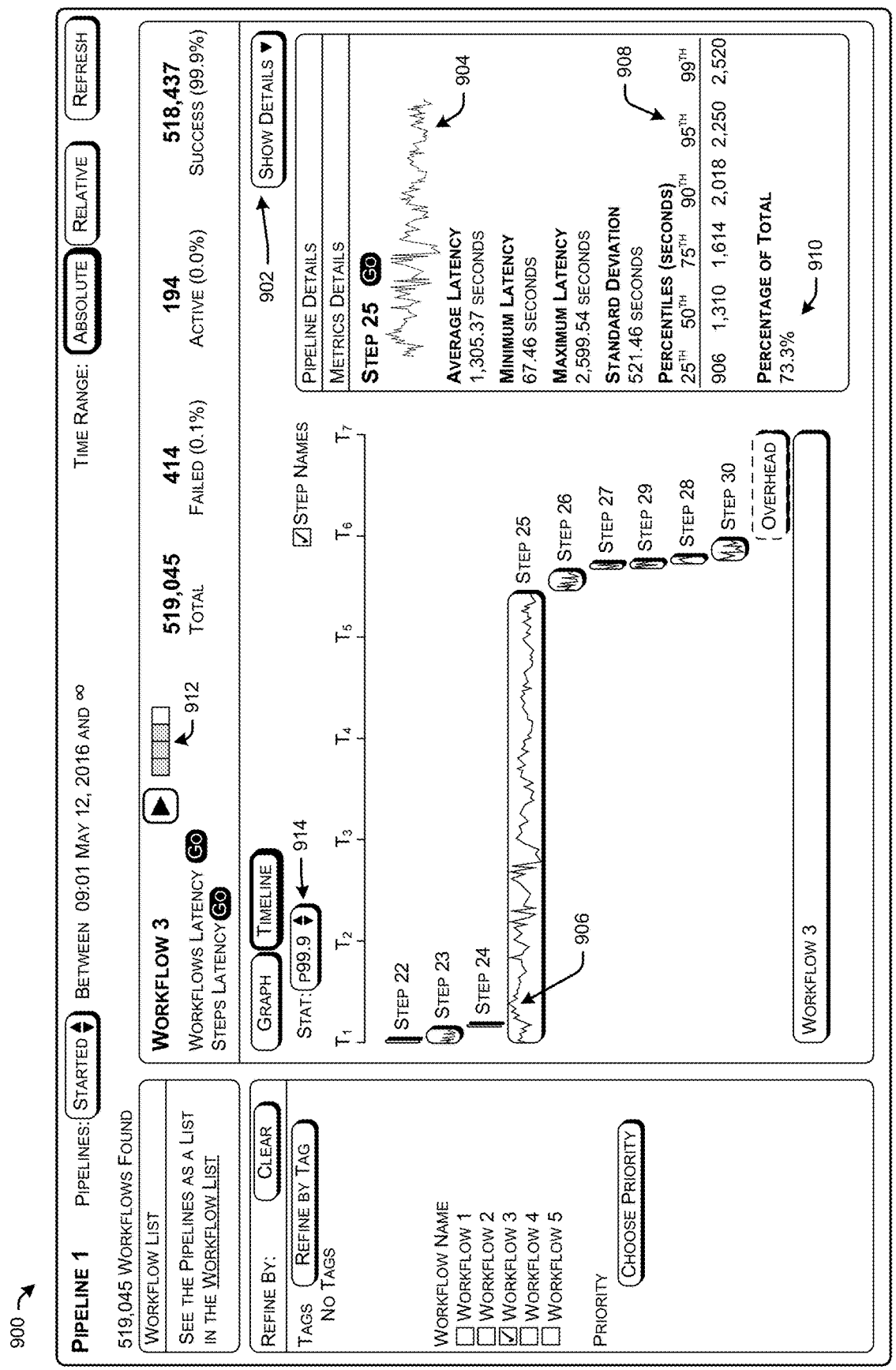
FIG. 9 shows a GUI illustrating a detail view of the aggregated latency timeline.

FIG. 9 shows a GUI 900 illustrating a detail view of the aggregated latency timeline. In some instances, the GUI 900 can illustrate the Pipeline 1, which can correspond to the Pipeline 1 in FIGS. 7 and 8. In some instances, FIG. 9 can be presented upon activation of the details selection button 902. In some instances, FIG. 9 can be presented upon selection of an individual aggregated step, such as Step 25, as illustrated in FIG. 9. For example, an activation of the Step 25 can cause presentation of the details corresponding to the aggregated data of Step 25. In some instances, the step details can illustrate a latency graph 904, which can correspond to the latency graph 906 illustrated in the timeline view. Further aggregated details can include, but are not limited to, average latency, minimum latency, maximum latency, standard deviation, and a latency associated with various percentiles of the aggregated data.

Percentiles 908 illustrate a table of latencies associated with various percentiles of the aggregated data. For example, the $25^{th}$ percentile represents an execution time whereby 25% of the aggregated workflows executed in less time. Similarly, the $99^{th}$ percentile indicating an execution time of 2,520 seconds indicates that 99% of the workflows including Step 25 executed Step 25 less than 2,520 seconds. In some instances, a percentage of total 910 can represent a total number of total instances of the particular step. In some instances, the total 910 can correspond to the bar graphic 912.

In some instances, the GUI 900 can include a statistics selection button 914 to select a display percentile for the aggregated data. For example, the statistics selection button 914 illustrates a selection of the $99.9^{th}$ percentile. Upon this selection, the GUI 900 can represent latency times whereby 99.9% of the workflows are shorter than the presented times. In some instances, the statistics selection button 914 can illustrate an average latency corresponding to the fastest 99.9% of the aggregated data. As can be understood, the statistics selection button 914 can be used to select any arbitrary selection percentage (e.g., 10%, 25%, 50%, 99%, 99.9%, 99.99%, etc.). In this manner, the GUI 900 can easily present worst-case execution times in order to effectively view the operation of various workflows in the workflow engine.

Thus, the workflow visualizations described herein illustrate workflows operations and can aggregate data and provide aggregated statistics to visually represent execution trends. By providing these unconventional visualizations in this manner, workflows can be understood and debugged, thereby improving a functioning of a computer, and improving a functioning of the workflows in general.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system for providing at least one graphical user interface, the system comprising:
   one or more processors; and
   one or more computer-readable media storing computer-executable instructions that, when executed by the one or more processors, cause the one or more processors to:
   receive first step data associated with a first step instance of a step of a workflow, the first step data including at least a first start time of the first step instance, a first end time of the first step instance, a first status of the first step instance, and first identification information of the first step instance;
   receive second step data from a second step instance of the step of the workflow, the second step data including at least a second start time of the second step instance, a second end time of the second step instance, a second status of the second step instance, and second identification information of the second step instance;
   aggregate, as aggregated step data, the first step data and the second step data to determine an average elapsed time of the first step instance and the second step instance;
   determine that the second status of the second step instance indicates that the second step instance encountered an exception and failed to complete at least some operations associated with the second step instance;
   present, via the at least one graphical user interface, a graphical indication of the step of the workflow, the graphical indication including an indication of the average elapsed time of the aggregated step data, including an indication of the exception associated with the second step instance, and including a graph view of the workflow illustrating an operational flow between individual steps of the workflow, wherein the at least one graphical user interface includes a selectable element to change between the graph view and a timeline view of the workflow;
   receive an activation of the selectable element; and
   in response to the activation of the selectable element, present the timeline view of the workflow via the at least one graphical user interface, the timeline view including at least a graphical representation of the step of the workflow scaled based in part on the average elapsed time of the step relative to an overall elapsed time of an operation of the workflow.

2. The system of claim 1, wherein the one or more processors are further configured to:
   receive, via the at least one graphical user interface, a selection of the exception; and
   based at least in part on the selection, present, via the at least one graphical user interface, additional information associated with an error log associated with the second step instance.

3. The system of claim 1, wherein the step of the workflow is a first step, wherein the graphical indication is a first graphical indication, and wherein the workflow further includes a second step that is dependent on the first step and a third step that is dependent on the second step, wherein the one or more processors are further configured to:
   present, via the at least one graphical user interface, a second graphical indication of the second step and the third step, the second graphical indication of the second step and the third step including an indication of the operation flow of the workflow between the first step, the second step, and the third step.

4. The system of claim 1, wherein the first step data includes tag information associated with the first step instance, and wherein the one or more processors are further configured to:
receive, via the at least one graphical user interface, searching information associated with the tag information and a time period of execution of the workflow; and
present, via the at least one graphical user interface, an updated graphical representation of the workflow, the updated graphical representation including at least one step instance based at least in part on the searching information.

5. The system of claim 1, wherein the indication of the exception associated with the second step instance includes a representation of one or more of:
a first number of exceptions;
a second number of successful steps; or
a third number of pending steps.

6. A system comprising:
one or more processors; and
one or more computer-readable media storing computer-executable instructions that, when executed by the one or more processors, cause the one or more processors to:
receive first step data associated with a first step of a workflow, the first step data including first timing information associated with execution of multiple first instances of the first step;
receive second step data associated with a second step of the workflow, the second step data including second timing information associated with execution of multiple second instances of the second step;
present, via at least one graphical user interface, a first graphical indication illustrating the first step in the workflow;
present, via the at least one graphical user interface, a second graphical indication illustrating the second step in the workflow;
receive, via the at least one graphical user interface, a selection of the first graphical indication;
in response to the selection, determine that at least one instance of the first step or the second step encountered an exception and failed to complete based at least in part on at least one of the first timing information or the second time information;
based at least in part on the selection, cause, via the at least one graphical user interface, presentation of an indication of at least a portion of the first timing information associated with the execution of the multiple first instances of the first step, and a graph view of the workflow illustrating an operational flow between individual steps of the workflow, wherein the at least one graphical user interface includes a selectable element to change between the graph view and a timeline view of the workflow;
receive an activation of the selectable element; and
in response to the activation of the selectable element, present the timeline view of the workflow via the at least one graphical user interface, the timeline view including at least a graphical representation of at least one of the first step or the second step scaled based in part on an average elapsed time of at least one of the first step or the second step relative to an overall time of an operation of the workflow.

7. The system of claim 6, wherein the one or more processors are further configured to:
receive third step data associated with an execution of multiple third instances of the first step of the workflow;
receive fourth step data associated with an execution of multiple fourth instances of the second step of the workflow;
aggregate, as first aggregated data, the first step data and the third step data to determine a first average elapsed time of the first step;
aggregate, as second aggregated data, the second step data and the fourth step data to determine a second average elapsed time of the second step; and
cause, via the at least one graphical user interface, presentation of a third graphical indication illustrating the first aggregated data and a fourth graphical indication illustrating the second aggregated data.

8. The system of claim 6, wherein the selection is a first selection, and wherein the one or more processors are further configured to:
receive, via the at least one graphical user interface, a second selection of a date range corresponding to one or more operations of the workflow;
retrieve a plurality of instances of the workflow, the plurality of instances of the workflow initiated within the date range;
determine a first portion of the plurality of instances of the workflow that completed processing;
determine a second portion of the plurality of instances of the workflow that are actively processing;
determine a third portion of the plurality of instances of the workflow that failed processing; and
cause, via the at least one graphical user interface, presentation of graphical indications of the first portion, the second portion, and the third portion, the graphical indications including at least a first number of instances associated with the first portion, a second number of instances associated with the second portion, and a third number of instances associated with the third portion.

9. The system of claim 6, wherein the selection is a first selection, and wherein the one or more processors are further configured to:
cause, via the at least one graphical user interface, presentation of a representation of the exception;
receive, via the at least one graphical user interface, a second selection of the exception; and
based at least in part on the second selection, cause, via the at least one graphical user interface, presentation of information relating to the exception.

10. The system of claim 6, wherein the first graphical indication and the second graphical indication are arranged in the at least one graphical user interface to indicate an operational relationship between the first step and the second step.

11. The system of claim 6, wherein the one or more processors are further configured to:
determine a first size of the first graphical indication based in part on a start time and an end time of the first step;
determine a second size of the second graphical indication based in part on a second start time and a second end time of the second step;
cause, via the at least one graphical user interface, presentation of the first graphical indication in accordance with the first size; and
cause, via the at least one graphical user interface, presentation of the second graphical indication in accordance with the second size, wherein the first size represents a first operation time of the first step and the second size represents a second operation time of the second step.

12. The system of claim 6, wherein the one or more processors are further configured to cause, via the at least one graphical user interface, presentation of a latency graph associated with a plurality of elapsed times of the multiple first instances of the first step over a time period, the latency graph presented over the first graphical indication.

13. The system of claim 6, wherein the graphical representation comprises a first graphical representation and the one or more processors are further configured to:
receive tag information associated with a tag associated with the first step;
cause, via the at least one graphical user interface, presentation of a third graphical indication of the tag;
receive, via the at least one graphical user interface, a selection of the third graphical indication of the tag;
aggregate the multiple first instances of the first step, the multiple first instances associated with the tag; and
cause, via the at least one graphical user interface, presentation of a second graphical representation of the multiple first instances of the first step, the second graphical representation of the multiple first instances of the first step including at least a number of instances of the multiple first instances including one or more exceptions.

14. A method comprising:
receiving first step data associated with a first step of a workflow, the first step data including first timing information associated with at least a first start time and a first end time of multiple instances of the first step;
receiving second step data associated with a second step of the workflow, the second step data including second timing information associated with at least a second start time and a second end time of multiple second instances of the second step;
causing, via at least one graphical user interface, presentation of a first graphical indication illustrating the first step in the workflow;
causing, via the at least one graphical user interface, presentation of a second graphical indication illustrating the second step in the workflow;
receiving, via the at least one graphical user interface, a selection of the first graphical indication;
in response to the selection, determining by at least one processor, that at least one instance of the first step or the second step encountered an exception and failed to complete based on the timing information;
based at least in part of the selection and the determining, causing by the at least one processor, via the at least one graphical user interface, presentation of an indication of the first timing information associated with the first step, and a graph view of the workflow illustrating an operational flow between individual steps of the workflow, wherein the at least one graphical user interface includes a selectable element to change between the graph view and a timeline view of the workflow;
receiving, by the at least one processor via the at least one graphical user interface, an activation of the selectable element; and
in response to the activation of the selectable element, presenting, by the at least one processor, the timeline view of the workflow via the at least one graphical user interface, the timeline view including at least a graphical representation of at least one of the first step or the second step scaled based in part on an average elapsed time of at least one the first step or the second step relative to an overall elapsed time of an operation of the workflow.

15. The method of claim 14, wherein the method further comprising:
receiving third step data associated with an execution of multiple third instances of the first step of the workflow;
receiving fourth step data associated with an execution of multiple fourth instances of the second step of the workflow;
aggregating, as first aggregated data, the first step data and the third step data to determine a first average elapsed time of the first step;
aggregating, as second aggregated data, the second step data and the fourth step data to determine a second average elapsed time of the second step; and
causing, via the at least one graphical user interface, presentation of a third graphical indication illustrating the first aggregated data and a fourth graphical indication illustrating the second aggregated data.

16. The method of claim 14, wherein the selection is a first selection, the method further comprising:
receiving, via the at least one graphical user interface, a second selection of a date range corresponding to one or more operations of the workflow;
retrieving a plurality of instances of the workflow, the plurality of instances of the workflow initiated within the date range;
determining a first portion of the plurality of instances of the workflow that completed processing;
determining a second portion of the plurality of instances of the workflow that are actively processing;
determining a third portion of the plurality of instances of the workflow that failed processing; and
causing, via the at least one graphical user interface, presentation of graphical indications of the first portion, the second portion, and the third portion, the graphical indications including at least a first number of instances associated with the first portion, a second number of instances associated with the second portion, and a third number of instances associated with the third portion.

17. The method of claim 14, wherein the selection is a first selection, the method further comprising:
causing, via the at least one graphical user interface, presentation of a representation of the exception;
receiving, via the at least one graphical user interface, a second selection of the exception; and
based at least in part on the second selection, causing, via the at least one graphical user interface, presentation of information relating to the exception.

18. The method of claim 14, wherein the graphical representation comprises a first graphical representation and the selection is a first selection, the method further comprising:
receiving tag information associated with a tag associated with the first step;
causing, via the at least one graphical user interface, presentation of a third graphical indication of the tag;
receiving, via the at least one graphical user interface, a second selection of the third graphical indication of the tag;
aggregating the multiple first instances of the first step, the multiple first instances associated with the tag; and
causing, via the at least one graphical user interface, presentation of a second graphical representation of the multiple first instances of the first step, the second graphical representation of the multiple first instances of the first step including at least a number of instances of the multiple first instances including one or more exceptions.

19. The method of claim 14, wherein the selection is a first selection, the method further comprising:

causing, via the at least one graphical user interface, presentation of a latency graph associated with a plurality of elapsed times of the multiple first instances of the first step over a time period, the latency graph presented over the first graphical indication;

receiving a second selection of the latency graph; and presenting latency information associated with the multiple first instances of the first step based at least in part on the second selection.

20. The method of claim 14, further comprising aggregating data associated with a plurality of instances of the workflow, wherein aggregating the data includes determining at least one of an average associated with the data or a standard deviation associated with the data.

* * * * *